United States Patent
Roth et al.

(10) Patent No.: US 6,817,669 B2
(45) Date of Patent: Nov. 16, 2004

(54) VEHICLE SEAT HAVING A FLOOR POSITION

(75) Inventors: Michael Roth, Rammelsbach (DE); Stefan Schehl, Dahn (DE); Steffen Brack, Mehlingen (DE); Jürgen Nasshan, Kaiserslautern (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 41 days.

(21) Appl. No.: 10/180,953

(22) Filed: Jun. 26, 2002

(65) Prior Publication Data

US 2003/0001419 A1 Jan. 2, 2003

(30) Foreign Application Priority Data

Jun. 26, 2001 (DE) .......................................... 101 30 813

(51) Int. Cl.[7] ................................................. B60N 2/00
(52) U.S. Cl. ..................... 297/340; 297/378.1; 297/334
(58) Field of Search ................................ 297/341, 340, 297/378.1, 378.12, 324, 334, 335; 296/65.05, 65.09, 65.16

(56) References Cited

U.S. PATENT DOCUMENTS

| | | | |
|---|---|---|---|
| 2,942,646 A | * | 6/1960 | Himka et al. |
| 3,316,014 A | | 4/1967 | Barecki |
| 3,700,203 A | | 10/1972 | Adams |
| 4,736,985 A | | 4/1988 | Fourrey et al. |
| 4,932,706 A | | 6/1990 | Wainwright et al. |
| 4,979,773 A | | 12/1990 | Eubank |
| 5,158,338 A | | 10/1992 | Hayakawa et al. |
| 5,195,795 A | | 3/1993 | Cannera et al. |
| 5,449,214 A | | 9/1995 | Totani |
| 5,482,349 A | | 1/1996 | Richter et al. |
| 5,588,707 A | | 12/1996 | Bolsworth et al. |
| 5,611,589 A | | 3/1997 | Fujii et al. |
| 6,000,742 A | * | 12/1999 | Schaefer et al. ......... 296/65.09 |
| 6,079,763 A | | 6/2000 | Clemente |
| 6,082,805 A | | 7/2000 | Gray et al. |
| 6,334,643 B1 | * | 1/2002 | Lindblad et al. ......... 296/65.09 |
| 6,336,679 B1 | * | 1/2002 | Smuk |
| 6,371,558 B1 | * | 4/2002 | Couasnon |
| 6,375,255 B1 | * | 4/2002 | Maruta et al. |
| 6,382,491 B1 | * | 5/2002 | Hauser et al. |

FOREIGN PATENT DOCUMENTS

| | | |
|---|---|---|
| DE | G 87 16 848.0 U1 | 3/1988 |
| DE | 44 39 975 A1 | 5/1996 |
| DE | 195 33 932 A1 | 3/1997 |
| DE | 196 07 060 C1 | 4/1997 |
| DE | 199 43 454 C1 | 1/2001 |
| DE | 199 64 143 A1 | 3/2001 |
| EP | 0 364 146 A2 | 4/1990 |
| EP | 0 622 268 A1 | 11/1994 |
| FR | 2 589 800 A1 | 5/1987 |
| GB | 2068216 A | 8/1981 |
| GB | 2 095 984 A | 10/1982 |
| JP | 55 164532 A | 3/1981 |

OTHER PUBLICATIONS

Application No. 10/127,269; filed Apr. 22, 2002; Entitled: *Vehicle Seat Having a Folded Position*; Inventor: Kammerer.

Application No. 10/097,550; filed Mar. 11, 2002; Entitled: *Vehicle Seat Having a Folded Position*; Inventors: Ellerich et al.

* cited by examiner

*Primary Examiner*—Milton Nelson, Jr.
(74) *Attorney, Agent, or Firm*—Alston & Bird LLP

(57) ABSTRACT

In the case of a vehicle seat, in particular a motor vehicle seat, having an articulated seat framework (3) and a backrest structure (7) which can be transferred from a seat position into a table position and/or a floor position by moving the seat framework (3) and/or the backrest structure (7), the seat framework (3) having a front foot region (15, 17) and at least one diagonal strut (31), the diagonal strut (31) being locked releasably to the front foot region (15, 17).

39 Claims, 4 Drawing Sheets

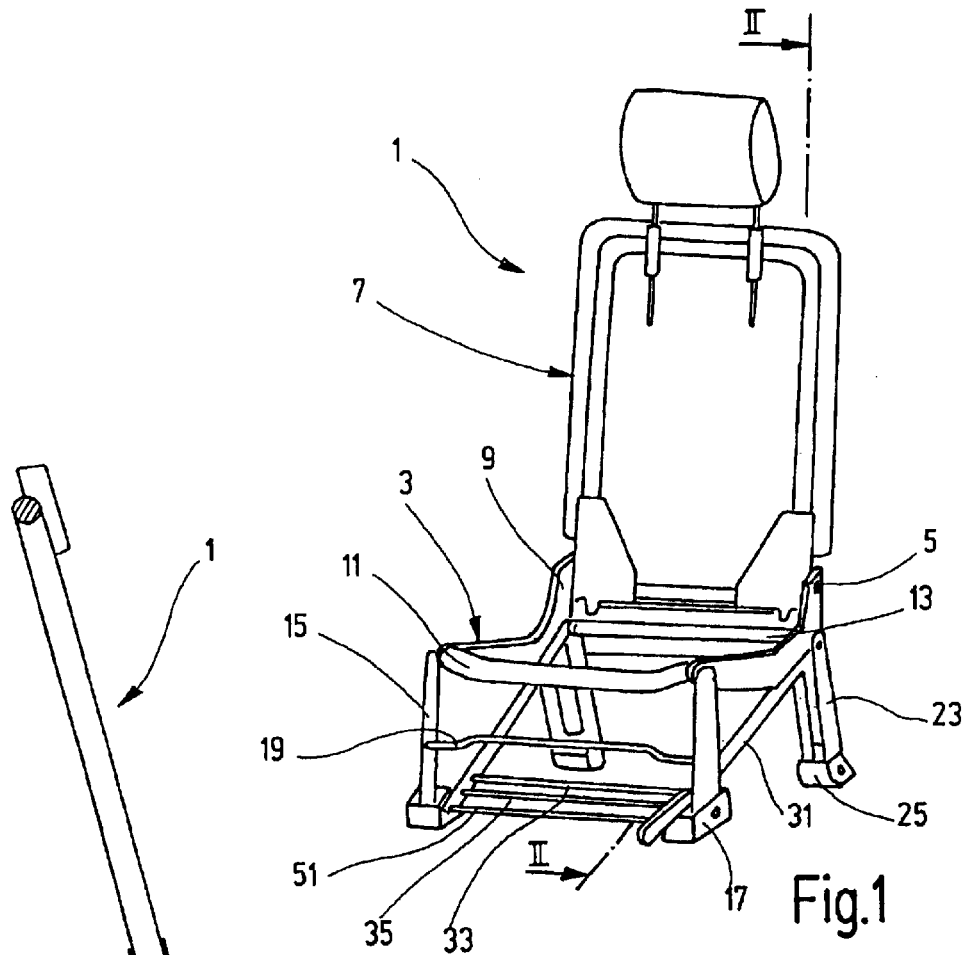
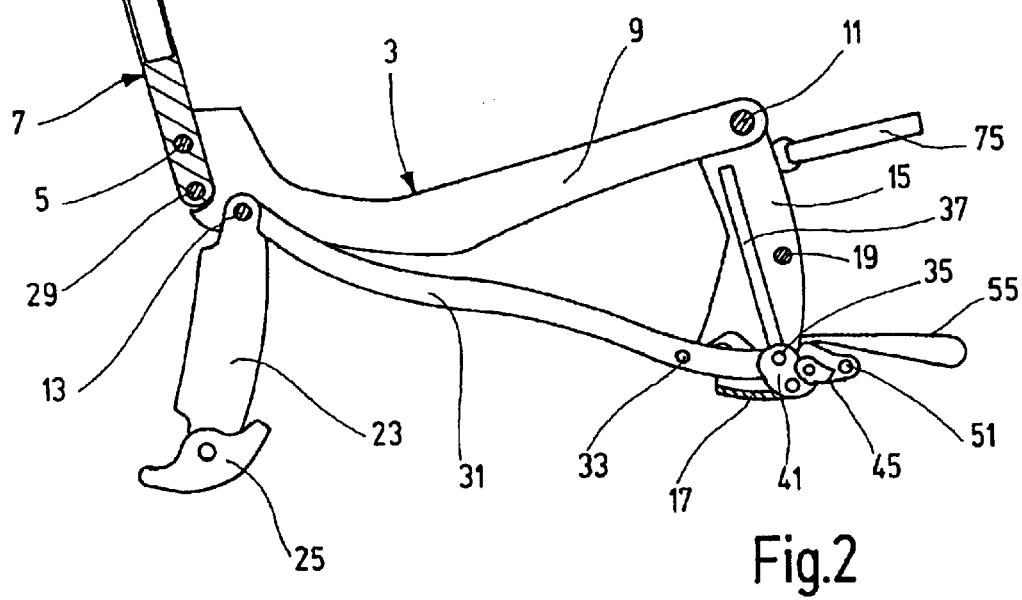

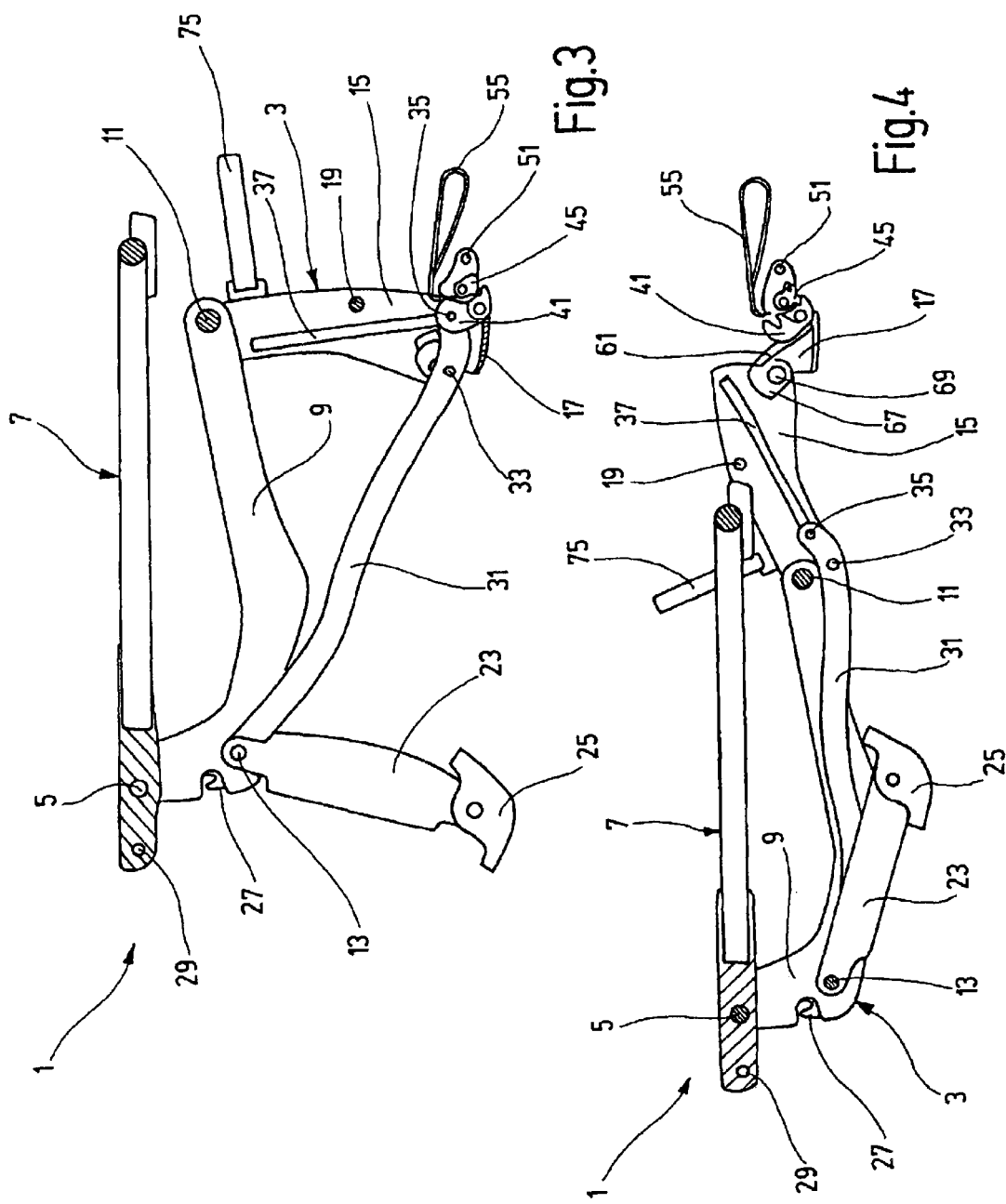

VEHICLE SEAT HAVING A FLOOR POSITION

BACKGROUND OF THE INVENTION

The present invention relates to a vehicle seat, in particular a motor vehicle seat, which can be reconfigured.

In the case of a known vehicle seat which can be reconfigured, in order to bring about a table position, the backrest structure is folded onto the seat framework in such a manner that the rear side of the backrest is aligned horizontally. If this increase in the loading area is not sufficient, the vehicle seat can be removed in its entirety. A vehicle seat of this type still leaves something to be desired in practice.

BRIEF SUMMARY OF THE INVENTION

One aspect of the present invention is the provision of improvements to a motor vehicle seat which can be reconfigured to bring about a table position, so that it can be further transferred into a floor position. In accordance with this aspect, an articulated seat framework is operative for being articularly downwardly folded to transfer the seat from the table position into the floor position, and thereafter operative for being articularly upwardly unfolded to transfer the seat from the floor position into the table position. In accordance with this aspect, the seat framework has a front foot region and at least one diagonal strut, and at least one locking device is mounted for releasably locking the diagonal strut to the front foot region. The seat is restricted from being transferred from the table position into the floor position while the diagonal strut is locked by the locking device. On the other hand, the seat can be transferred from the table position into the floor position while the diagonal strut is not locked by the locking device.

In accordance with one aspect of the present invention, the vehicle seat can be transferred from the seat position into the table position and/or the floor position by moving the seat framework and/or the backrest structure.

By virtue of the diagonal strut being locked releasably to the front foot region, i.e. the releasable locking device being provided which locks the diagonal strut and the front foot region to each other, the shape of the seat framework, and therefore the position of the vehicle seat, can be changed in a simple manner. The locked diagonal strut preferably holds the seat framework in a dimensionally stable manner. On the other hand, when the diagonal strut is unlocked, the seat framework, which is designed, for example, as a four-bar linkage, can be folded up, in particular can be folded substantially flat. A floor position of this type means that the vehicle seat no longer has to be removed in order to increase the loading area. The front foot region preferably has a guide for a controlled movement of the diagonal strut. Preferably, one diagonal strut is provided on each side of the vehicle seat in order to distribute the forces symmetrically, the two diagonal struts being connected to each other for stability reasons by means of at least one common, horizontal crosspiece.

In a preferred design, in order to lock the diagonal strut, a retaining hook is provided in the front foot region. That is, the locking device includes a retaining hook. The retaining hook at least partially engages, preferably in a form-fitting manner, around a bar portion (e.g., bolt and/or a crosspiece) of the diagonal strut. This bolt or this crosspiece preferably simultaneously forms the same component which is guided in that guide of the front foot region which is provided for the diagonal strut. The retaining hook, which, for example, is of pivotable design and is spring-loaded, can, for example, be removed from the bolt or the crosspiece manually by various unlocking elements, such as hand loops, pivotable levers or shafts.

The invention is advantageous, in particular, for rear seat rows of a "van". The flat, generally recessed floor position enables the loading area of the van to be greatly increased without the vehicle seat having to be removed. With the design according to the invention, a simple operation is provided. The invention may also be used for other type vehicles.

BRIEF DESCRIPTION OF THE DRAWINGS

Figure 5:
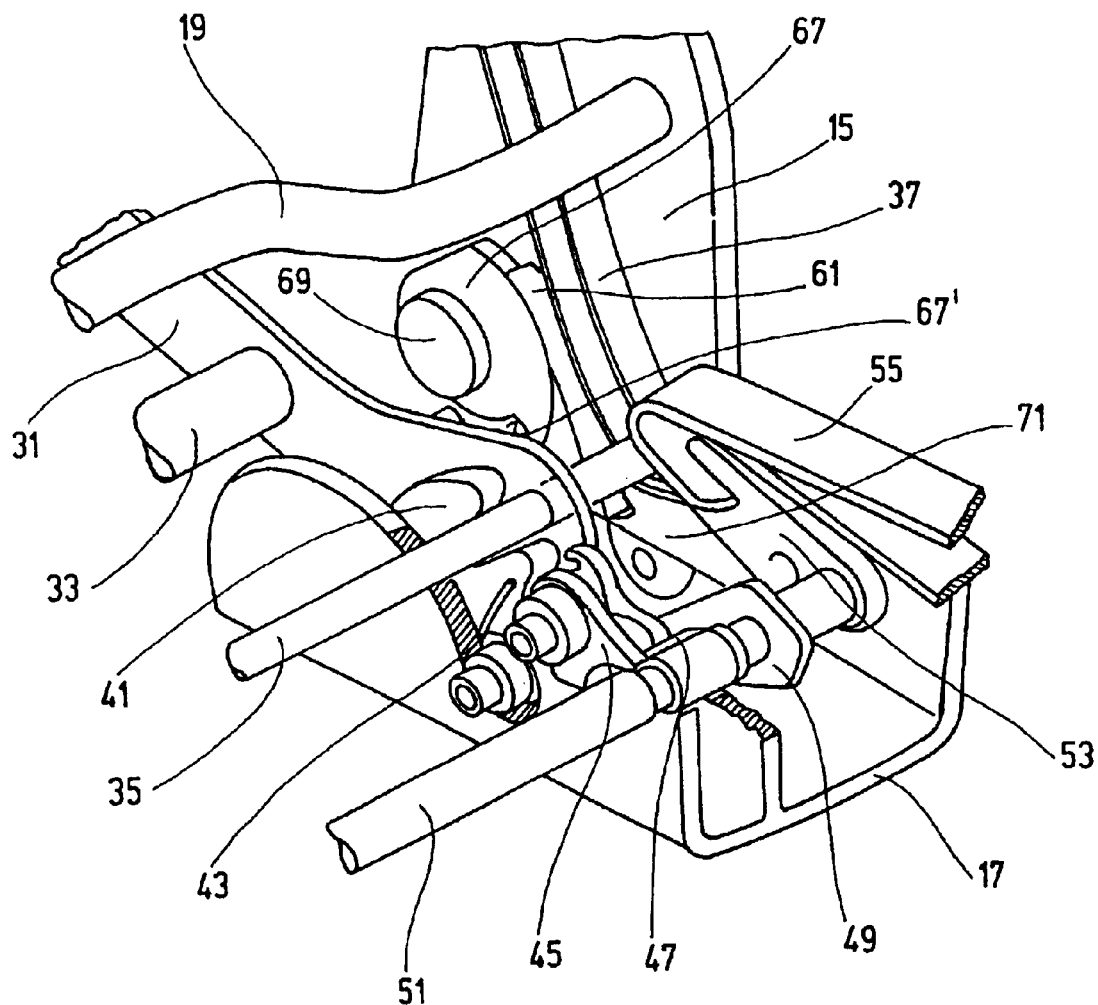
Figure 6:
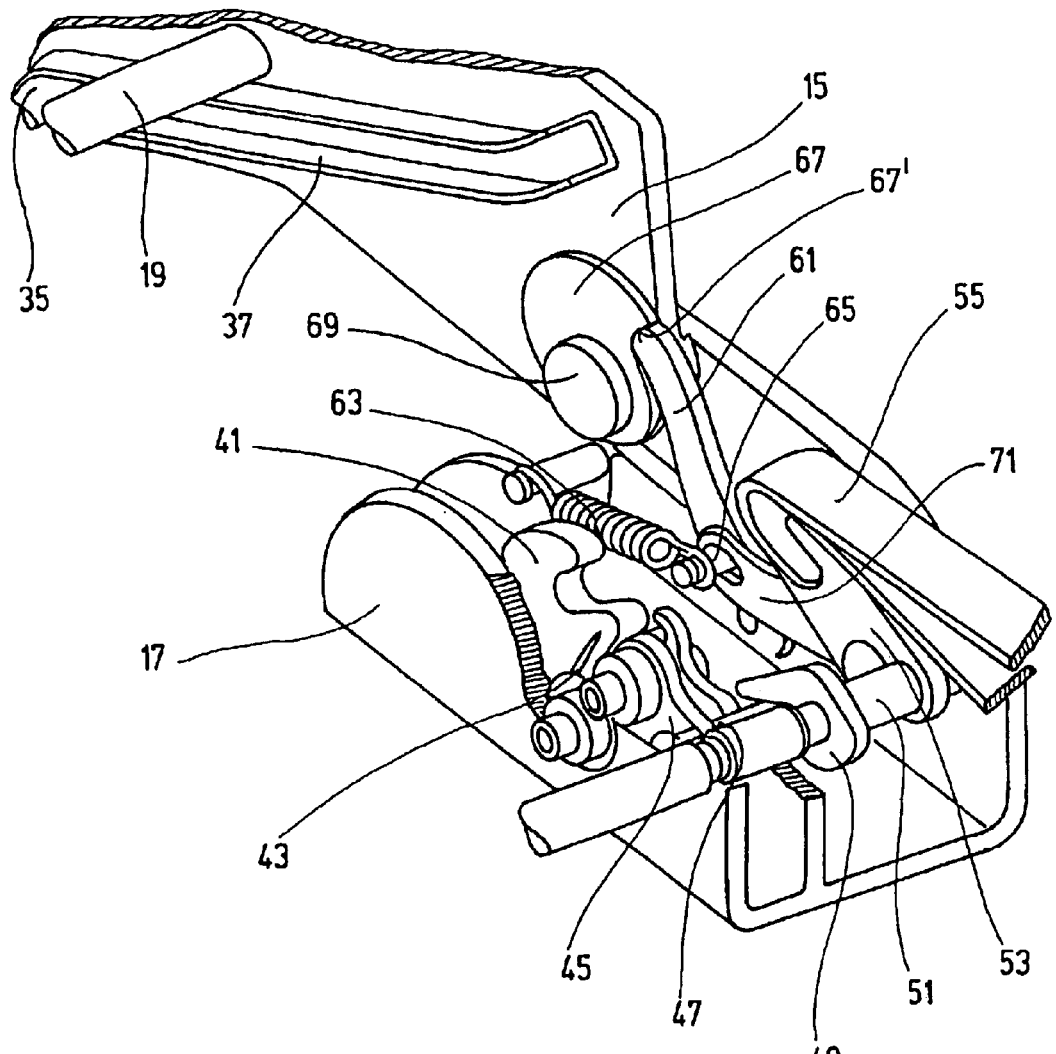

Having thus described the invention in general terms, reference will now be made to the accompanying drawings. The invention is explained in greater detail below with reference to an exemplary embodiment illustrated in the drawings, in which:

FIG. 1 shows a perspective view of the structure of the exemplary embodiment,

FIG. 2 shows a section along the line II—II in FIG. 1 through the exemplary embodiment in the seat position, FIG. 3 shows an illustration corresponding to FIG. 2 in the table position, FIG. 4 shows an illustration corresponding to FIG. 2 in the floor position, FIG. 5 shows a perspective view, which is partially cut away, of the front foot region in the seat position and the table position, and FIG. 6 shows an illustration corresponding to FIG. 5 in the floor position.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The vehicle seat 1 is designed as a rear seat of a motor vehicle, preferably for a third seat row of a "van". As the seat part structure, the vehicle seat 1 has a seat framework 3 on which a backrest structure 7 of a backrest is articulated by means of two aligned backrest pivot bolts 5. The seat framework 3 bears a seat cushion (not illustrated) in a manner known per se. On the left-hand side and on the right-hand side, with respect to the direction of travel, the seat framework 3 has in each case a seat frame side part 9 in which one of the backrest pivot bolts 5 in each case is mounted. The two seat frame side parts 9 are connected fixedly to each other in their front region by a front seat frame crosspiece 11 and in their rear region by a rear seat frame crosspiece 13, forming a seat frame. In the following, first of all the seat position of the vehicle seat 1 is described.

A respective front rocker 15 is articulated by its upper end on both sides of the front seat frame crosspiece 11. The front rocker 15 is articulated by its lower end on a front bearing bracket 17 fixed on the vehicle structure. Preferably, the front rocker 15 and the front bearing bracket 17 form a front foot region of the seat framework 3. The two front rockers 15 are connected fixedly to each other by means of a rocker crosspiece 19. In the rear region of each seat frame side part 9, a rear rocker 23 is articulated by its upper end on the rear seat frame crosspiece 13. The rear rocker 23 is articulated by its lower end on a rear bearing bracket 25 fixed on the vehicle structure. Fixed on the seat frame side parts 9, in the region between the respective backrest pivot bolt 5 and the rear seat frame crosspiece 13, are respective backrest locking means 27 which use hooks to lock the backrest locking bolts 29, which are fixed on the backrest structure.

A respective diagonal strut 31 is also articulated by its rear end on the rear seat frame crosspiece 13. The two diagonal struts 31 are connected to each other in the region of their front end by means of a load-carrying diagonal strut crosspiece 33 and by means of a locking crosspiece 35, which is preferably designed as a rod. The locking crosspiece 35 is locked to the front bearing bracket 17 in a manner described in greater detail below. Each end of the locking crosspiece 35 is arranged in each case within a guide 37 of the associated front rocker 15. The guide 37, which is connected fixedly to the front rocker 15, is designed with a U-shaped profile and runs along the front rocker 15 perpendicularly with respect to the locking crosspiece 35.

As a locking device, a retaining hook 41 is mounted pivotably in each front bearing bracket 17. The retaining hook 41, by being acted upon by a leg spring 43, at least partially engaging around the locking crosspiece 35 and locking it in a form-fitting manner. Furthermore, a projection 45 from which a driver bolt 47 protrudes laterally is mounted in the front bearing bracket 17, with its pivot axis parallel to the retaining hook 41. The driver bolt 47 is engaged around by a driver clip 49 which sits in a rotationally fixed manner on an unlocking crosspiece 51, which is designed as a rod. The unlocking crosspiece 51 is mounted at each of its two ends in a rotatable manner in one of the front bearing brackets 17. Sitting on the unlocking crosspiece 51 in a rotationally fixed manner at one end is an unlocking lever 53 which is provided with an unlocking loop 55 which can be grasped manually.

Furthermore, an elongated latch 61 is mounted pivotably in each front bearing bracket 17. A tension spring 63, which engages on a pin 65 protruding laterally from the latch 61, prestresses the latch 61 toward a disk cam 67. The disk cam 67 is seated with respect to the front rocker 15 in a rotationally fixed manner on a rocker bearing bolt 69 which forms the point of articulation of the front rocker 15 on the front bearing bracket 17. A connecting lever 71, which at one end surrounds the pin 65 by means of an elongated hole, is articulated by its other end on the unlocking lever 53.

Apart from the seat position described above, the vehicle seat 1 can also take up other positions. For the transfer into the "table position", the backrest locking means 27 are unlocked thereby releasing the backrest locking bolt 29. The backrest structure 7 can then be folded forward round the backrest pivot bolt 5 into an at least approximately horizontal position. The rear side of the backrest is then used as a loading area. In both positions mentioned, the seat framework 3 is held in a dimensionally stable manner, i.e. immovably, by the locking of the locking crosspiece 35 of the diagonal struts 31. The selected arrangement of the diagonal struts 31 obliquely forward and downward means that in the event of a crash, the forces acting on the backrest are introduced into the vehicle structure.

From the table position, for the transfer into the floor position or flat-floor position the unlocking loop 55 is pulled by hand. The unlocking lever 53 is used to rotate the unlocking crosspiece 51 which moves the driver bolt 47 via the driver clip 49. This causes the projection 45 to pivot, said projection pressing against the retaining hook 41 in such a manner that the latter pivots rearward and downward counter to the force of the leg spring 43 and thereby releases the locking crosspiece 35. As a four-bar linkage, the seat framework 3 can then be folded rearward in a substantially flat manner. In the process, the ends of the locking crosspiece 35, which are arranged and guided on the end side in the guides 37 of the front rockers 15, slide along these guides, as a result of which the folding movement of the seat framework 3 is guided. The disk cam 67 is supported on the latch 61 by means of a lug 67' as soon as the floor position is reached. This secures the disk cam 67. In the floor position, the vehicle seat 1 is stashed in a floor recess in such a manner that an increased loading area is available.

For the return from the floor position into the table position of the vehicle seat 1, the latch 61 is first of all pivoted back via the unlocking loop 55, the unlocking lever 53 and the connecting lever 71, with the result that the latch 61 releases the disk cam 67. The seat framework 3 is then pulled up by means of a pull-up loop 75 which is attached to a front rocker 15. In the process, the ends of the locking crosspiece 35 again slide along the guides 37 of the front rockers 15 in order to control the movement of the seat framework 3. The retaining hooks 41, which are provided with a run-on slope, engage around the locking crosspiece 35 as soon as the latter has reached the lower end of the guides 37, which end is positioned in the front bearing brackets 17. The table position is thus reached again. For the transfer into the seat position, the backrest structure 7 is folded upward until the backrest locking bolts 29 drop into the backrest locking means 27.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vehicle seat, comprising:

an articulated seat framework operative for being articularly downwardly folded to transfer the seat from a table position into a floor position, and thereafter operative for being articularly upwardly unfolded to transfer the seat from the floor position into the table position, with the seat framework having a front foot region and at least one diagonal strut;

at least one locking device mounted for releasably locking the diagonal strut to the front foot region, wherein the locking device and the diagonal strut are cooperative for restricting the seat from being transferred from the table position into the floor position while the diagonal strut is locked by the locking device; and a backrest structure pivotably mounted to the seat framework so that the backrest structure can be transferred between a seat position and the table position, wherein the diagonal strut is mounted so that the diagonal strut is removed from the front foot region while the diagonal strut is not locked by the locking device and the seat is transferred from the table position into the floor position.

2. A vehicle seat according to claim 1, wherein the seat framework is substantially flat in the floor position.

3. A vehicle seat according to claim 1, wherein the locking device includes a retaining hook that is in the front foot region and at least partially engages around a bar portion of the diagonal strut for releasably locking the diagonal strut.

4. A vehicle seat according to claim 1, wherein the diagonal strut holds the seat framework in a dimensionally stable manner while the diagonal strut is locked by the locking device.

5. A vehicle seat according to claim 1, wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one horizontal crosspiece that is mounted to both of the first and second diagonal struts.

6. A vehicle seat according to claim 5, wherein the seat framework is substantially flat in the floor position.

7. A vehicle seat according to claim 1, wherein the seat framework includes a guide, with at least a portion of the guide being in the front foot region, and the guide being operative for guiding movement of the diagonal strut away from the front foot region while the diagonal strut is not locked by the locking device and the seat is transferred from the table position into the floor position.

8. A vehicle seat according to claim 7, wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one horizontal crosspiece that is mounted to both of the first and second diagonal struts.

9. A vehicle seat according to claim 7, wherein the locking device includes a retaining hook that is in the front foot region and at least partially engages around a bar portion of the diagonal strut for releasably locking the diagonal strut.

10. A vehicle seat, comprising:
an articulated seat framework operative for being articularly downwardly folded to transfer the seat from a table position into a floor position, and thereafter operative for being articularly upwardly unfolded to transfer the seat from the floor position into the table position, with the seat framework having a front foot region and at least one diagonal strut;
at least one locking device mounted for releasably locking the diagonal strut to the front foot region, wherein the locking device and the diagonal strut are cooperative for restricting the seat from being transferred from the table position into the floor position while the diagonal strut is locked by the locking device; and
a backrest structure pivotably mounted to the seat framework so that the backrest structure can be transferred between a seat position and the table position,
wherein the locking device includes a retaining hook that is in the front foot region and at least partially engages around a bar portion of the diagonal strut for releasably locking the diagonal strut.

11. A vehicle seat according to claim 10, wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one horizontal crosspiece that is mounted to both of the first and second diagonal struts.

12. A vehicle seat according to claim 10, wherein the diagonal strut is mounted so that the diagonal strut is removed from the front foot region while the diagonal strut is not locked by the locking device and the seat is transferred from the table position into the floor position.

13. A vehicle seat according to claim 10, further comprising unlocking elements that are operative so that the retaining hook can be removed from the bar portion manually via the unlocking elements.

14. A vehicle seat according to claim 10, wherein the diagonal strut holds the seat framework in a dimensionally stable manner while the diagonal strut is locked by the locking device.

15. A vehicle seat according to claim 10, wherein the seat framework is substantially flat in the floor position.

16. A vehicle seat according to claim 10, wherein the seat framework includes a guide, with at least a portion of the guide being in the front foot region, and the guide being operative for causing the front end of the diagonal strut to be moved along a front rocker so that the diagonal strut is moved away from the front foot region while the diagonal strut is not locked by the locking device and the seat is transferred from the first position into the floor position.

17. A vehicle seat according to claim 10, wherein the diagonal strut holds the seat framework in a dimensionally stable manner while the diagonal strut is locked by the locking device.

18. A vehicle seat according to claim 10, wherein the bar portion of the diagonal strut extends into and is guided in a guide of the seat framework, with at least a portion of the guide being in the front foot region, and the guide being operative for guiding movement of the diagonal strut away from the front foot region while the diagonal strut is not locked by the locking device and the seat is transferred from the table position into the floor position.

19. A vehicle seat according to claim 18, further comprising unlocking elements that are operative so that the retaining hook can be removed from the bar portion manually via the unlocking elements.

20. A vehicle seat according to claim 18, wherein the seat framework is substantially flat in the floor position.

21. A vehicle seat, comprising:
an articulated seat framework operative for being articularly downwardly folded to transfer the seat from a first position into a floor position, and thereafter operative for being articularly upwardly unfolded to transfer the seat out of the floor position and into the first position, with the seat framework having a front foot region and at least one diagonal strut;
at least one locking device mounted for releasably locking the diagonal strut to the front foot region, wherein the locking device and the diagonal strut are cooperative for restricting the seat from being transferred from the first position into the floor position while the diagonal strut is locked by the locking device; and
a backrest structure mounted to the seat framework,
wherein the front foot region comprises a front rocker and the diagonal strut is mounted so that the diagonal strut is moved in a manner such that a front end of the diagonal strut is moved along the front rocker while the diagonal strut is not locked by the locking device and the seat is transferred from the first position into the floor position, and
wherein the seat framework includes a guide, with at least a portion of the guide being in the front foot region, and the guide being operative for causing the front end of the diagonal strut to be moved along the front rocker so that the diagonal strut is moved away from the front foot region while the diagonal strut is not locked by the locking device and the seat is transferred from the first position into the floor position.

22. A vehicle seat according to claim 21, wherein the backrest structure is mounted to the seat framework so that the backrest structure can be pivoted between a table position and a seat position, and the first position is the table position.

23. A vehicle seat according to claim 21, wherein the seat framework is substantially flat in the floor position.

24. A vehicle seat according to claim 21, wherein the diagonal strut holds the seat framework in a dimensionally stable manner while the diagonal strut is locked by the locking device.

25. A vehicle seat according to claim 21, wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one crosspiece that is mounted to both of the first and second diagonal struts for moving with both of the first and second diagonal struts while the seat is transferred from the first position to the floor position.

26. A vehicle seat according to claim 25, wherein the crosspiece extends horizontally.

27. A vehicle seat according to claim 25, wherein the guide is operative for causing the front end of the first diagonal strut to be moved along the front rocker so that the first diagonal strut is moved away from the front foot region while the first diagonal strut is not locked by the locking device and the seat is transferred from the first position into the floor position.

28. A vehicle seat according to claim 25, wherein the first and second diagonal struts hold the seat framework in a dimensionally stable manner while the first and second diagonal struts are locked by the locking device.

29. A vehicle seat according to claim 25, wherein the seat framework is substantially flat in the floor position.

30. A vehicle seat, comprising:
an articulated seat framework operative for being articularly downwardly folded to transfer the seat from a first position into a floor position, and thereafter operative for being articularly upwardly unfolded to transfer the seat out of the floor position and into the first position, with the seat framework having a front foot region and at least one diagonal strut;
at least one locking device mounted for releasably locking the diagonal strut to the front foot region, wherein the locking device and the diagonal strut are cooperative for restricting the seat from being transferred from the first position into the floor position while the diagonal strut is locked by the locking device; and
a backrest structure mounted to the seat framework,
wherein the front foot region comprises a front rocker and the diagonal strut is mounted so that the diagonal strut is moved in a manner such that a front end of the diagonal strut is moved alone the front rocker while the diagonal strut is not locked by the locking device and the seat is transferred from the first position into the floor position, and
wherein the locking device includes a retaining hook that is in the front foot region and at least partially engages around a bar portion of the diagonal strut for releasably locking the diagonal strut.

31. A vehicle seat according to claim 30, wherein the diagonal strut is a first diagonal strut positioned at a first side of the vehicle seat, a second diagonal strut is positioned at a second side of the vehicle seat that is opposite from the first side of the vehicle seat, the first and second diagonal struts are connected to each other by at least one horizontal crosspiece that is mounted to both of the first and second diagonal struts, and the bar portion of the first diagonal strut is an end of the crosspiece.

32. A vehicle seat according to claim 30, wherein the front rocker includes a guide, the bar portion of the diagonal strut extends into and is guided in the guide of the front rocker, at least a portion of the guide is in the front foot region, and the guide is operative for causing the front end of the diagonal strut to be moved along the front rocker so that the diagonal strut is moved away from the front foot region while the diagonal strut is not locked by the locking device and the seat is transferred from the first position into the floor position.

33. A vehicle seat according to claim 30, further comprising unlocking elements that are operative so that the retaining hook can be removed from the bar portion manually via the unlocking elements.

34. A vehicle seat according to claim 30, wherein the front foot region comprises a front bearing bracket, and the retaining hook is mounted at the bearing bracket.

35. A vehicle seat according to claim 34, wherein the front rocker is pivotably mounted to the front bearing bracket.

36. A vehicle seat, comprising:
an articulated seat framework operative for being articularly downwardly folded to transfer the seat from a first position into a floor position, and thereafter operative for being articularly upwardly unfolded to transfer the seat out of the floor position and into the first position, with the seat framework having a front foot region and at least one diagonal strut;
at least one locking device mounted for releasably locking the diagonal strut to the front foot region, wherein the locking device and the diagonal strut are cooperative for restricting the seat from being transferred from the first position into the floor position while the diagonal strut is locked by the locking device; and
a backrest structure mounted to the seat framework,
wherein the front foot region comprises a front rocker and the diagonal strut is mounted so that the diagonal strut is moved in a manner such that a front end of the diagonal strut is moved along the front rocker while the diagonal strut is not locked by the locking device and the seat is transferred from the first position into the floor position,
wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one crosspiece that is mounted to both of the first and second diagonal struts for moving with both of the first and second diagonal struts while the seat is transferred from the first position to the floor position, and
wherein the front rocker includes a guide, the crosspiece extends into and is guided in the guide of the front rocker, at least a portion of the guide is in the front foot region, and the guide is operative for causing the front end of the first diagonal strut to be moved along the front rocker so that the first diagonal strut is moved away from the front foot region while the first diagonal strut is not locked by the locking device and the seat is transferred from the first position into the floor position.

37. A vehicle seat, comprising:

an articulated seat framework operative for being articularly downwardly folded to transfer the seat from a first position into a floor position, and thereafter operative for being articularly upwardly unfolded to transfer the seat out of the floor position and into the first position, with the seat framework having a front foot region and at least one diagonal strut;

at least one locking device mounted for releasably locking the diagonal strut to the front foot region, wherein the locking device and the diagonal strut are cooperative for restricting the seat from being transferred from the first position into the floor position while the diagonal strut is locked by the locking device; and a backrest structure mounted to the seat framework, wherein the front foot region comprises a front rocker and the diagonal strut is mounted so that the diagonal strut is moved in a manner such that a front end of the diagonal strut is moved along the front rocker while the diagonal strut is not locked by the locking device and the seat is transferred from the first position into the floor position, wherein the diagonal strut is a first diagonal strut positioned at a first side of the vehicle seat, and a second diagonal strut is positioned at a second side of the vehicle seat that is opposite from the first side of the vehicle seat, with the first and second diagonal struts being connected to each other by at least one crosspiece that is mounted to both of the first and second diagonal struts for moving with both of the first and second diagonal struts while the seat is transferred from the first position to the floor position, and wherein the locking device includes a retaining hook that is in the front foot region and at least partially engages around the crosspiece for releasably locking the first and second diagonal struts.

38. A vehicle seat according to claim 37, wherein the front foot region comprises a front bearing bracket to which the front rocker is pivotably mounted, and the retaining hook is mounted at the bearing bracket.

39. A vehicle seat according to claim 37, further comprising unlocking elements that are operative so that the retaining hook can be removed from the crosspiece manually via the unlocking elements.

* * * * *